(12) United States Patent
Aoyama et al.

(10) Patent No.: US 6,383,620 B1
(45) Date of Patent: May 7, 2002

(54) ANTIREFLECTION ARTICLE

(75) Inventors: Takahisa Aoyama; Tetsuo Shimizu; Norihito Otsuki; Norio Nagahama, all of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/242,344

(22) PCT Filed: Aug. 12, 1997

(86) PCT No.: PCT/JP97/02811

§ 371 Date: Mar. 15, 1999

§ 102(e) Date: Mar. 15, 1999

(87) PCT Pub. No.: WO98/07056

PCT Pub. Date: Feb. 19, 1998

(30) Foreign Application Priority Data

Aug. 14, 1996 (JP) ............................................. 8-214520
May 21, 1997 (JP) ............................................. 9-130877

(51) Int. Cl.[7] .......................... B32B 5/02; B32B 25/14; B32B 27/08; B32B 27/30
(52) U.S. Cl. ....................... 428/212; 428/336; 428/421; 428/522
(58) Field of Search ................................ 526/242, 255; 428/421, 422, 328, 522, 212, 336

(56) References Cited

U.S. PATENT DOCUMENTS

| 4,158,678 A | 6/1979 | Tatemoto et al. | 522/141 |
|---|---|---|---|
| 4,687,707 A | 8/1987 | Matsuo et al. | 428/336 |
| 5,095,081 A | 3/1992 | Bacque et al. | 526/216 |
| 5,284,893 A | 2/1994 | Kubo et al. | 524/315 |
| 5,449,558 A | 9/1995 | Hasegawa et al. | 428/422 |
| 6,064,524 A * | 5/2000 | Oka et al. | 359/582 |

FOREIGN PATENT DOCUMENTS

| JP | 584728 B2 | 1/1983 |
|---|---|---|
| JP | 59-030847 A * | 2/1984 |
| JP | 219801 A | 1/1990 |
| JP | 273256 | 3/1990 |
| JP | 2245702 A | 10/1990 |
| JP | 36265 A | 1/1991 |
| JP | 328206 A | 2/1991 |
| JP | 323493 B2 | 3/1991 |
| JP | 394201 | 4/1991 |
| JP | 3116102 | 5/1991 |
| JP | 3170901 | 7/1991 |
| JP | 474568 A | 3/1992 |
| JP | 4189879 A | 7/1992 |
| JP | 6136064 A | 5/1994 |
| JP | 7126552 A | 5/1995 |
| JP | 7151904 A | 6/1995 |
| JP | 7168003 A | 7/1995 |
| JP | 7168005 A | 7/1995 |
| JP | 7168006 A | 7/1995 |
| JP | 8100136 | 4/1996 |
| JP | 8142280 A | 6/1996 |

OTHER PUBLICATIONS

Derwent abstract 1984–078779, abstract of JP 59–030847, 1984.*
Loudon, G. Marc, Organic Chemistry, 2nd Edition, p. 881, 1988.*
Hawley's Condensed Chemical Dictionary, pp. 157–158 and 574, 1998.*
English translation of JP 59–030847, Feb. 1984.*

* cited by examiner

Primary Examiner—Paul Thibodeau
Assistant Examiner—Ramsey Zacharia
(74) Attorney, Agent, or Firm—Birch, Stewart, Kolasch & Birch, LLP

(57) ABSTRACT

An antiglare-treated article comprising an acrylic resin substrate and a fluorine-containing polymer coating formed on the surface of the substrate, wherein the thickness of the coating is in the range between 0.03 and 0.5 $\mu$m, and the fluorine-containing polymer has a refractive index in the range between 1.30 and 1.40 and comprises a block which is compatible with the acrylic resin and a block comprising a fluorine-containing elastomer. This treated article can be stably produced at low costs although it has the same abrasion resistance and antiglare effects as those of conventional antiglare-treated articles, or it has better antiglare effects than conventional antiglare films while maintaining abrasion resistance.

11 Claims, No Drawings

ANTIREFLECTION ARTICLE

This application is the national phase under 35 U.S.C. §371 of prior PCT International Application No. PCT/JP97/02811 which has an International filing date of Aug. 12, 1997 which designated the United States of America.

FIELD OF THE INVENTION

The present invention relates to an antiglare-treated article. In particular, the present invention relates to an antiglare-treated article having a fluorine-containing polymer coating on its surface.

PRIOR ART

In recent years, displaying instruments are often used outdoors, as small-sized information terminals such as liquid crystal TV or PDA (persona digital assistants), and video cassette recorders having a liquid crystal display become popularized. In such cases, external light is reflected mainly on the surface of a display, and thus visibility of the display sometimes severely deteriorates. When such instruments are used indoors, room lights or users themselves are mirrored on the display surface, so that the contrast of images deteriorates. Therefore, it is desirable to perform an antiglare treatment on display surfaces in order to improve the image quality.

In the case of apparatuses using sun light such as solar batteries, solar water heaters, etc., about 10% of solar light cannot reach the apparatuses since it is reflected on protection plates. If an antiglare treatment is preformed on protection plates, the energy loss caused by reflection decreases, and thus the energy-conversion efficiency of the apparatuses can be easily improved.

Some reflection may make showcases or show-windows more attractive as a whole. However, it may be necessary to decrease the reflection of external light on the glass surfaces for the original purpose to show goods clearly.

In the field of floor model displays, projection TV and plasma displays are become popularized, and it is expected that the size of a display screen will further increase. In such a case, the edge parts of the display screen suffer from the influence of the reflection of external light, since the angle of visibility is widened so that an angle between the line of vision and the display screen decreases at the edge parts of the screen. Thus, it is desirable to perform an antiglare treatment on display surfaces in order to display beautiful images in every corner of the displays.

Antiglare treatment is roughly classified into non-glare treatment and anti-reflection (AR) treatment.

The non-glare treatment is widely employed, since is very economical of material costs and processing costs, and achieves effects to some extent. However, the non-glare treatment cannot avoid the blur of images which are seen through a treated film, since it simply blurs the reflected images by light-scattering. Thus, the non-glare treatment is not suitable for displays which require high definitions such as high-definition TV or digital video equipment. Furthermore, the non-glare treatment scatters not only the reflected light but also transmitted light. Thus, it has adverse effects on the improvement of light transmission.

JP-A-2-245702 and JP-A-7-168006 disclose methods for the decrease of a reflectance by forming coatings having refractive indexes which decrease stepwise from the refractive index of a substrate. The disclosed methods can decrease the reflectance to about a quarter, but a part of such decrease may result from the non-glare effect. Thus, the same drawbacks as those caused by the above non-glare treatment may arise.

Accordingly, the AR treatment is preferable as the antiglare treatment. However, till lately, only vapor deposition multi-layer films are known as films which are practically useful from the viewpoint of abrasion resistance and antiglare properties. The formation of vapor deposition films has drawbacks in that they require large-scale equipment, have low productivity and need high treatment costs. Furthermore, the sizes of articles which can be treated are limited.

To overcome such drawbacks, a method is proposed, which comprises successively performing the antiglare treatment on a continuous substrate by the formation of a resin film having a low refractive index, which greatly improves the productivity.

In general, in the case of the AR treatment with a resin, the thickness of an anti-reflection film is preferably about 0.1 $\mu$m, and the anti-reflection effect increases as the refractive index of the resin decreases. Thus, fluororesins are often used as resins for anti-reflection treatment (see JP-A-6-136064, JP-A-7-126552, JP-A-2-19801, JP-A-7-168003, JP-A-7-168005 (=U.S. Pat. No. 5,449,558), etc.).

The abrasion resistance of a film is as important as a refractive index. A film does not have sufficient abrasion resistance, when a resin is simply applied. Thus, it has been tried to improve the abrasion resistance of a resin film.

One method for the formation of an anti-reflection film from a resin comprises the curing of a solution containing an acrylic monomer, which is disclosed in JP-A-6-136064 and JP-A-7-126552. However, fluorine-containing acrylic polymers usually have a refractive index of 1.36 or more. Some fluorine-containing acrylic polymers have a lower refractive index than 1.36. However, such a low refractive index may be considered as that of polymers containing a relatively large amount of unreacted monomers. The refractive index of a fluorine-containing acrylic polymer increases while antiglare effects deteriorate, when the amount of fluorine-free reactive groups is increased to improve the hardness of a film by crosslinking or to improve the adhesion properties of the formed film.

In addition, the above method has two problems. One problem is that the method includes a photo-curing process. Since the thickness of an anti-reflection film is usually about 0.1 $\mu$m, the surface area of the film is very large in comparison with the film thickness, and thus the resin is easily in contact with polymerization inhibitors such as oxygen in an air, so that a curing reaction does not steadily proceed. A large amount of a polymerization initiator should be added to stabilize the polymerization reaction. However, the polymerization initiators increase a refractive index and thus deteriorates the antiglare effect of the resin. Another problem is that the fluctuation of a reaction rate leads to the fluctuation of a time until the complete curing. As a result, the total amount of monomers which evaporate fluctuates, and thus the thickness of an anti-reflection film may not be stabilized. In addition, a resin film cannot be re-coated, since the method includes a curing step.

An anti-reflection film comprising a fluorine-containing alicyclic polymer is also known from, for example, JP-A-2-19801. The refractive index of this polymer is as low as 1.34. When an undercoat is made in the form of a self-restorable film as disclosed in JP-A-7-168005, no process is necessary to improve the abrasion resistance by curing. Thus, the productivity of anti-reflection films greatly increases.

However, alicyclic perfluoropolymers can be dissolved only in very expensive fluorine-containing solvents such as perfluoro(2-butyltetrahydrofuran), perfluorobenzene, etc. Thus, the treatment costs greatly increase. In addition, such fluorine-containing solvents have a drawback that their evaporation rates are too high. Therefore, a film-formation method is practically limited only to a coating method which is called a die coating method that is disclosed in JP-A-7-151904.

The refractive index of a fluorine-containing alicyclic polymers is 1.34 or larger, which is higher than that of perfluoropolyethers, perfluoroelastomers, etc. (e.g. about 1.30). Antiglare-treated articles which are treated with the fluorine-containing alicyclic polymers have inferior antiglare effects to those treated with TEFLON AF (trademark), perfluoropolyethers, perfluoroelastomers, etc.

TEFLON AF (trademark) and perfluoroelastomers have high antiglare effects, but their abrasion resistance has not been improved to a practically satisfactory level.

It was tried to form a film having abrasion resistance by curing perfluoropolyethers (see JP-B-3-23493 (=U.S. Pat. No. 4,687,707)). However, since curing sites (e.g. alkoxysilane groups, etc.) decrease the fluorine content in the whole polymer, the inherent refractive index of the perfluoropolyether (about 1.30) increases to 1.40 or larger. Thus, the antiglare effects deteriorate in comparison with the fluorine-containing alicyclic polymers.

JP-A-3-6265 discloses a method to disperse an inorganic compound having a low refractive index in a curable resin matrix to obtain a film having high hardness and a low refractive index. This method can provide an antiglare film having sufficient abrasion resistance when a resin having a high hardness is selected as a curable resin matrix. However, such a resin has a refractive index of 1.38 or larger, and thus the antiglare effects deteriorate.

JP-A-8-100136 discloses a method for curing a fluororubber by mixing a polymerizable component in the fluororubber. However, the polymerizable component greatly increases a refractive index, and thus the refractive index of the rubber increases to 1.41 or larger. Thus, such a cured fluororubber has inferior antiglare effects to other materials when the same substrate is used.

SUMMARY OF THE INVENTION

One object of the present invention is to provide an antiglare-treated article in which a film thickness is stabilized, and which can be produced at low costs, while it has the same abrasion resistance and antiglare effects as the prior art.

Another object of the present invention is to provide an antiglare-treated article which is treated with a polymer having better antiglare effects than the prior art antiglare films while maintaining abrasion resistance.

To achieve these objects, the present invention provides an antiglare-treated article comprising an acrylic resin substrate and a fluorine-containing polymer coating formed on the surface of the substrate, wherein the thickness of the coating is in the range between 0.03 and 0.5 $\mu$m, and the fluorine-containing polymer has a refractive index in the range between 1.30 and 1.40 and comprises a block which is compatible with the acrylic resin and a block comprising a fluorine-containing elastomer.

In the case of antiglare films utilizing interference, an optimum film thickness depends on the wavelength of light to be reflected and the refractive index of a material constituting the film, as disclosed in JP-A-4-74568, and a film thickness d is expressed by the following formula:

$$d = (\lambda/4) \cdot (1/n) \cdot m$$

in which $\lambda$ is a wavelength, n is the refractive index of a film material, and m is a positive odd number.

When m is 3 or larger, the film may have a large thickness. However, the dependency of antiglare effects on the wavelength becomes unpreferably large. When n is 1.36, which is the refractive index of the polymer 2 used in below-described Examples, and $\lambda$ is 550 nm which is the median wavelength of the visible light range, the optimum thickness is 0.10 $\mu$m, and a film should be very thin.

Many vinylidene polymer coatings are known from JP-A-3-28206 (=U.S. Pat. No. 5,095,081) and JP-A-4-189879 (=U.S. Pat. No. 5,284,893). However, all the coatings should be coated at a thickness of several micrometers or larger, in many cases, at a thickness of 10 $\mu$m. or larger. Thus, an article which is simply coated with the vinylidene polymer coating and the article of the present invention are clearly different in the thickness of a coated film.

A film thickness is preferably from 0.03 to 0.5 $\mu$m to effectively prevent light reflection in a visible-UV ray range and a near infrared ray range (wavelength of 200–1700 nm), while a film thickness is preferably from 0.07 to 0.14 $\mu$m to prevent the reflection of only visible light (wavelength of 400–700 nm).

An optimum refractive index is proximately expressed by the formula:

$$n = (n_s)^{0.5}$$

in which $n_s$ is the refractive index of a substrate, in accordance with JP-A-7-74568. That is, the optimum refractive index n depends on the refractive index $n_s$ of the substrate.

Resins which are usually used as substrates are acrylic resins, polyethylene terephthalate, polycarbonate, etc, and their refractive indexes $n_s$ are in the range between about 1.48 and about 1.65. Thus, n is preferably 1.26 or less according to the above formula.

However, none of conventional polymers satisfy this refractive index value. Therefore, it is desirable to decrease the refractive index of a film forming the outermost layer of a substrate as low as possible in order to improve the antiglare effects.

Fluorine-containing polymers, which are used in the present invention, comprise one or more blocks of an elastomer, and one or more blocks compatible with an acrylic resin. A refractive index is preferably 1.40 or less, since the antiglare effects are not satisfactory when the refractive index exceeds 1.40. The refractive indexes of the polymers used in accordance with the present invention cannot be made lower than 1.30 by the application of conventional methods. Thus, the range of a refractive index which is realized and achieves the antiglare effects is in the range between 1.30 and 1.40.

Rubber films having a thickness of several micrometers or larger tend to be easily flawed due to their softness. When the thickness of rubber films is decreased to a submicron order, and the films are closely adhered to substrates, flaws are minimal even when the films are flawed, and such minute flaws cannot be observed with an eye. Furthermore, the elasticity of rubbers imparts flexibility to the film surfaces, and the rubbers stuff up the flaws, even when the film surfaces are flawed. Thus, the flaws are less observable, and the good appearance of film surfaces is maintained.

However, if a force is exerted onto the films so that flaws reach substrates, it is inevitable that the articles are damaged. Thus, it is preferable to improve the abrasion resistance of substrates rather than the abrasion resistance of films, in order to improve the abrasion resistance of articles.

The above explanations are based on the premise that the adhesion between an antiglare film and a substrate is sufficiently high. If the adhesion is weak, the film itself is peeled off from the substrate, and the condition of such articles is visually the same as that of the flawed articles. The adhesion of films to substrates is insufficient in many cases, when polymer thin films are simply formed, and such films are easily peeled off by wiping the films with cotton cloth, etc. under pressure. Therefore, it is necessary to use films which form chemical bonds with substrates, which physically bond to substrates, or which has compatibility with substrate materials, as thin films. It is preferable for thin films to adhere to substrates by compatibility, since the treatment of the films after the formation is easy and reliable.

Examples of the combinations of films and substrates which are compatible each other are as follows:

Combinations the same types of resins:

When a substrate is made of an acrylic resin, a film comprises an acrylic polymer, and when a substrate is made of a polyethylene terephthalate resin, a film comprises a polyethylene terephthalate polymer.

Combinations of resins having different structures:

Examples of such combinations include the combination of a vinylidene fluoride (VdF) polymer and an acrylic resin, and the combination of a VdF polymer and a vinyl ester polymer.

The present invention has been completed based on the above considerations.

That is, the present invention has been completed based on the finding that the drawbacks of conventional antiglare-treated articles can be solved by the use of a fluorine-containing polymer as an antiglare film, which has a refractive index in the range between 1.30 and 1.40, and comprises a block compatible with at least an acrylic resin and a block comprising a fluorine-containing elastomer, when a substrate is made of an acrylic resin.

DETAILED DESCRIPTION OF THE INVENTION

Acrylic resins which are used as substrates in the present invention are suitably selected from various conventional acrylic resins. In this case, such acrylic resins should be selected from the viewpoint of compatibility with blocks which are contained in a fluorine-containing elastomer to be used as an antiglare film and have compatibility with acrylic resins.

Preferable examples of acrylic resins are as follows:

(1) Homopolymers of (meth) acrylic acid or its ester of the formula:

$$CH_2=CR^1COOR^2 \tag{I}$$

wherein $R^1$ is a hydrogen atom, a chlorine atom, a fluorine atom or an organic group having at least one carbon atom, preferably 1 to 4 carbon atoms, and $R^2$ is a hydrogen atom, an organic group having at least one carbon atom, preferably 1 to 8 carbon atoms, or a metal atom, or copolymers of the acid or ester of the formula (I) and other monomer.

Specific examples of the organic group having at least one carbon atom are alkyl groups such as $-CH_3$, $-(CH_2)_nCH_3$ in which n is an integer of 1 to 21, etc.; aromatic groups such as $-CH_2C_6H_5$, $-C_6H_5$, $-CH_2CH_2-C_6H_5$, etc.; $-(CH_2)_nOH$ in which n is an integer of 1 to 21; groups having alkoxysilane; fluorine-containing groups such as $-CH_2(CF_2)_nCF_3$, $-CH_2(CF_2)_nH$, etc.; epoxy group-containing groups such as a glycidyl group; groups having a carboxyl group such as $-(CH_2)_nCOOH$, etc.; and the like.

Specific examples of the above (meth) acrylic acid or its esters of the formula (I) are as follows:

(meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert.-butyl (meth)acrylate, hexyl (meth)acrylate, 2-ethylhexyl (meth)acrylate, ethylcarbitol (meth)acrylate, methyl triglycol (meth)acrylate, methyl propylene glycol (meth)acrylate, methyl dipropylene glycol (meth)acrylate, methyl tripropylene glycol (meth)acrylate, polypropylene glycol mono(meth)acrylate (having a number average molecular weight of 150 to 1000), stearyl (meth)acrylate, phenoxyethyl (meth)acrylate, ethoxyethyl (meth)acrylate, methoxyethyl (meth)acrylate, butoxyethyl (meth)acrylate, N,N-diethylaminoethyl (meth)acrylate, N,N-dimethylaminoethyl (meth)acrylate, glycidyl (meth)acrylate, allyl (meth)acrylate, 2-hydroxyethyl (meth)acrylate, 2-methoxyethoxyethyl (meth)acrylate, 2-ethoxyethoxyethyl (meth)acrylate, benzyl (meth)acrylate, cyclohexyl (meth)acrylate, dicyclopentenyl (meth)acrylate, dicyclopentenyloxy (meth)acrylate, 2-hydroxyethyl(meth)acryloyl phosphate, tetrahydrofurfuryl (meth)acrylate, dicyclopentadienyl (meth)acrylate, dicyclopentadienethoxy (meth)acrylate, p-benzylphenoxyethyl (meth)acrylate, 1,6-hexanediol mono(meth)acrylate, neopentyl glycol (meth)acrylate, glycerol mono(meth)acrylate, trimethylolpropane mono(meth)acrylate, pentaerythritol mono(meth)acrylate, 2-hydroxy-3-phenyloxypropyl (meth)acrylate, 2-hydroxy-3-octyloxypropyl (meth)acrylate, diethylene glycol mono (meth) acrylate, polyethylene glycol (400) mono(meth)acrylate, methyl polypropylene glycol mono (meth) acrylate (having a number average molecular weight of 150 to 1000),

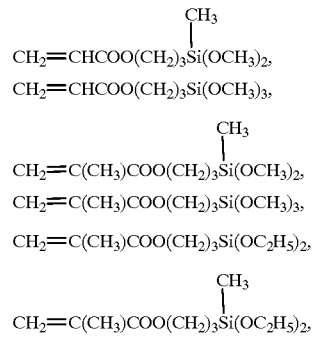

(2) Homopolymers of maleic or fumaric acid or its ester of the formula:

$$CHCOOR^3=CHCOOR^2 \tag{II}$$

wherein $R^1$ and $R^2$ are the same as defined above, or copolymers of the acid or ester of the formula (II) and other monomer (3) Homopolymers and copolymers of unsaturated polybasic acids such as citoraconic acid, mesaconic acid, itaconic acid, etc. or their esters.

Specific examples of maleic or fumaric acid or its esters are as follows:

Fumaric acid, diethyl fumarate, di-n-butyl fumarate, di-isobutyl fumarate, di-tert.-butyl fumarate, dipropyl fumarate, di-2-ethyl hexyl fumarate, dihexyl fumarate, ethyl butyl fumarate, dibutyl maleate, dioleyl maleate, n-butyl tert.-butyl maleate, and ethyl isobutyl fumarate.

Copolymers of compounds having two or more polymerizable double bonds in a molecule may be used. A typical example of such a compound is a compound of the formula

wherein $R^1$ and R' are the same or different and represent a hydrogen atom, a chlorine atom, a fluorine atom or an organic group having at least one carbon atom, preferably 1 to 4 carbon atom, and $R^3$ is an organic group having at least one carbon atom, preferably 1 to 8 carbon atom.

Specific examples of the compound (III) are as follows:

Ethylene glycol di(meth)acrylate, diethylene glycol di(meth)acrylate, triethylene glycol di(meth)acrylate, polyethyelen glycol di(meth)acrylate (having a number average molecular weight of 150 to 1000), propylene glycol di(meth)acrylate, dipropylene glycol di(meth) acrylate, tripropylene glycol di(meth)acrylate, polyropylene glycol di(meth)acrylate (having a number average molecular weight of 200 to 1000), neopentyl glycol di (meth) acrylate, 1,3-butanediol di(meth)acrylate, 1,4-butanediol di(meth)acrylate, 1,6-hexanediol di(meth)acrylate, hydroxypivalate ester neopentyl glycol di(meth)acrylate, bisphanol A di(meth)acrylate, trimethylolpropane tri(meth)acrylate, pentaerithritol tri (meth)acrylate, dipentaerithritol hexa(meth)acrylate, pentaerithritol tetra(meth)acrylate, trimethylolpropane di(meth)acrylate, dipentaerithritol monohydroxy-penta (meth)acrylate; NEOMER NA-305, NEOMER BA-601, NEOMER TA-505, NEOMER TA-401, NEOMER PHA405X, NEOMER TA705X, NEOMER EA400X, NEOMER EE401X, NEOMER EP405X, NEOMER HB601X, NEOMER HB605X (all available from SANYO CHEMICAL INDUSTRIES, LTD.); and KAYARAD HX-220, HX-620, D-310, D-320, D-330, DPHA, DPCA-20, DPCA-30, DPCA-60 and DPCA-120 (all available from NIPPON KAYAKU CO., LTD.).

When the above monomer compounds contain a chlorine atom, or a hydrogen atom is substituted with a bromine atom, obtained polymers have an increased refractive index, and thus the properties of antiglare films are preferably improved. The same effects can be achieved by the increase of side chains having aromatic groups in the polymers.

The above monomers maybe copolymerized with other monomers to improve flexibility, chemical resistance, weather resistance, functions, beauties, impact resistance and/or heat resistance of acrylic resins which are prepared from the above monomers, to adjust a refractive index for the improvement of the adhesion to fluorine-containing polymers, or to reduce the costs of acrylic resins. Examples of other monomers are acrylonitrile, methacrylonitrile, vinyl esters (e.g. vinyl stearate, vinyl pivalate, etc.), vinyl ethers (e.g. vinyl butyl ether, hydroxybutyl vinyl ether, etc.), styrenes (e.g. styrene, α-methylstyrene, etc.), vinyl halides (e.g. vinyl fluoride, vinyl chloride, etc.), vinylidene halides (e.g. vinylidene fluoride, vinylidene chloride, etc.), vinyl alkyl ketones (e.g. vinyl methyl ketone, etc.), butadienes (e.g. 1,3-butadiene, etc.), ethylene, isoprene, halogen-containing olefins (e.g. tetrafluoroethylene, hexafluoropropylene, chloroprene, chlorotrifluoroethylene, etc.), allyl acetate, vinyl acetate, carbazole,

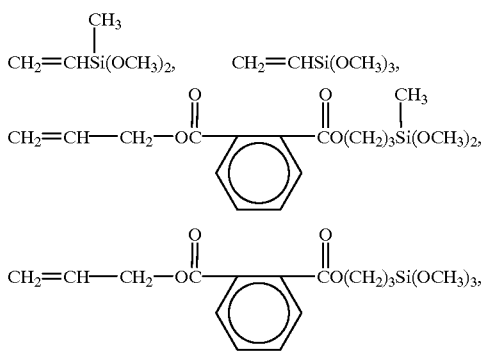

and the like.

When a monomer other than acrylic compounds is copolymerized, the compatibility between acrylic resins and VdF copolymers may decrease. Thus, the amount of the other monomer is preferably 10 mole % or less of the whole copolymer. Furthermore, homo- or copolymers of other monomer(s) may be blended with acrylic resins. In this case, the amount of the homo- or copolymer of other monomer(s) is preferably 30 wt. % or less of the whole resin weight for the same reason as above.

The body of the antiglare-treated article of the present invention maybe wholly made of the above acrylic resin, although it may be an article made of other material on which the above acrylic resin is laminated or coated. It is possible to perform an antiglare treatment on the sheet or film of an acrylic resin and then to laminate such a sheet or film on an article made of other material.

Coating may be carried out by applying the solution of an acrylic resin on the surface of an article made of other material, or applying an liquid containing a monomer which forms an acrylic resin on the surface of an article made of other material and then curing the monomer with actinic rays such as UV rays or electron beams. After coating, the strength and impact resistance of the coated resin layer may be increased by any known methods, such as crosslinking through chemical bonding with isocyanates, silanes, epoxy compounds, etc., or ionic crosslinking. The crosslinking reaction may be accelerated with actinic rays such as UV rays, electron beams, etc., heat, IR rays, moisture, or crosslinking accelerators such as acids, alkalis, etc.

It may be possible to coat the layer of a fluorine-containing polymer on the coated acrylic resin. The amount of the coated acrylic resin which is dissolved is small, when the fluorine-containing polymer is coated. Thus, such an amount can be negligible when the thickness of the coated acrylic resin is sufficiently large. However, when the coated acrylic resin is in a thin film form having a thickness of, for example, 0.1 micrometer, the reduction rate of the coated film is large even when the small amount of the acrylic resin is dissolved, and thus the thickness of the coated acrylic resin may easily be reduced to a half, or all the film may be dissolved. Therefore, it is preferable to crosslink the acrylic resin to prevent the dissolution, when the thickness of the coated acrylic resin is 2 micrometers or less. The crosslinking methods are the same as described above.

However, if a crosslinking density is too high, the motion of molecules is suppressed so that acrylic resins have no interaction with fluorine-containing polymers and the adhesion of the acrylic resins to the fluorine-containing polymers may deteriorate. In such a case, a crosslinking density should be decreased. Measures to decrease a crosslinking density are as follows:

1. The use of polymers having the small number of functionalities which contribute to crosslinking.
2. The decrease of the amount of compounds which contribute to crosslinking (which are generally called "crosslinking agents").
3. The use of the mixture of an acrylic resin having no crosslinking site and a crosslinkable polymer.
4. The use of the mixture of an acrylic resin having no crosslinking site and a polymer which is not dissolved in the solution of a fluorine-containing polymer.

When the above measures are employed independently or in combination, an acrylic resin coating can be formed, which has good adhesion to fluorine-containing polymers and is not dissolved in the solution of the fluorine-containing polymers. The crosslinkable polymer and the polymer which is not dissolved in the solution of a fluorine-containing polymer may not necessarily be an acrylic polymer, if the amount of such a polymer is 30 wt. % or less of the resin composition. The most effective measure to improve the adhesion properties is the measure 3 in which a crosslinkable acrylic resin is used as a crosslinkable polymer.

The kind of the above-described other material is not limited insofar as acrylic resins can be adhered to the other material. Examples of the other material include inorganic materials such as glass, stones, concrete, tiles, etc.; synthetic resins such as vinyl chloride resins, polyethylene terephthalate, cellulose resins (e.g. triacetylcellulose, etc.), polycarbonate resins, polyolefin resins, acrylic resins, phenol resins, xylene resins, urea resins, melamine resins, diallyl phthalate resins, furan resins, amino resins, alkyd resins, urethane resins, vinyl ester resins, polyimide resins, etc.; metals such as iron, aluminum, copper, etc.; wood, paper, printed materials, printing papers, paints, and the like. The decoration of an article can be improved by performing antiglare treatment on a part other than a specific part so that the shape of the specific part is highlighted with reflected light.

Fluorine-containing polymers

Fluorine-containing polymers may be selected from those having the above refractive index from the viewpoint of having a compatibility to an acrylic resin as a substrate and good adhesion properties to the acrylic resin. To this end, fluorine-containing polymers should have polymer blocks which are explained below.

For example, homopolymer or copolymer blocks of vinylidene fluoride are preferable. Vinylidene fluoride can provide copolymers having a variety of properties when the kind or combination of other monomer and the amount of other monomer are suitably selected, since vinylidene fluoride can be copolymerized with various kinds of other monomer. Accordingly, when vinylidene fluoride copolymers are used to produce the antiglare-treated article of the present invention, vinylidene fluoride polymers having suitable properties can be designed in accordance with the kind of an acrylic resin as a substrate.

Preferred but non-limiting examples of VdF copolymer blocks will be exemplified.

Hereinafter, TFE, HFP, 3FCl and HFA mean tetrafluoroethylene, hexafluoropropylene, trifluorochloroethylene, and hexafluoroacetone, respectively.

Copolymer of 70–90 mole % of VdF and 10–30 mole % of TFE, copolymer of 60–90 mole % of VdF and 10–40 mole % of HFP, coopolymer of 60–70 mole % of VdF, 10–25 mole % of TFE and 5–30 mole % of HFP, copolymer of 40–60 mole % of VdF, 10–40 mole % of TFE and 15–45 mole % of HFP, copolymer of 35–55 mole % of VdF, 35–55 mole % of TFE and 5–15 mole % of HFP, copolymer of 60–90 mole % of VdF, 5–20 mole % of TFE and 13–30 mole % of 3FCl, copolymer of 30–95 mole % of VdF, 1–30 mole % of TFE and 5–70 mole % of HFA.

Since elastomer blocks have higher adhesion to acrylic resins, preferable copolymer blocks are as follows:

Copolymer of 60–90 mole % of VdF and 10–40 mole % of HFP, copolymer of 40–60 mole % of VdF, 10–40 mole % of TFE and 15–45 mole % of HFP, copolymer of 35–55 mole % of VdF, 35–55 mole % of TFE and 5–15 mole % of HFP, copolymer of 30–95 mole % of VdF, 1–30 mole % of TFE and 5–70 mole % of HFA.

The refractive index of a fluorine-containing polymer can be decreased while maintaining the adhesion properties, when a fluorine content in VdF copolymer blocks is increased while maintaining the molar ratio of VdF units at a high level. To this end, it is preferable to use a copolymerizable monomer having a high fluorine content. In the concrete, as copolymerizable monomers, HFP or perfluoromethyl vinyl ethers (PMVE) are more preferable than TFE, and perfluoropropyl vinyl ether is particularly preferable. More preferably, $CF_2=CF-O-[CF_2-CF(CF_3)-O-]_n-C_3F_7$ in which n is an integer of 1 to 4 is used.

It is known that copolymers of VdF and perfluorovinyl ethers foam upon heating. It is possible to decrease the refractive index of the copolymers while maintaining the transparency of the copolymer, when the size of formed bubbles is adjusted at about 10 nm. The size of bubbles may be 100 nm or less, if slightly white turbidity is accepted.

The adhesion properties do not materially change, when the content of VdF is larger than 50 mole %. When the content of VdF is less than 50 mole %, the adhesion may decrease as the content of VdF decreases. Thus, a block which imparts adhesion properties to a copolymer preferably comprises 50 mole % or more of VdF.

The effects of the present invention are not impaired, when about 5 mole % or less of known monomers are additionally copolymerized in the VdF homopolymer or copolymers having the above compositions.

As described in the paragraphs in relation to the abrasion resistance, molecules of polymers should have blocks comprising elastomers, since coatings as a whole should have elasticity.

Here, the "elastomers" mean polymers having a modulus of $10^8$ dyne/cm$^2$ or less in terms of E', storage modulus. The elastomers include liquid ones as such. Elastomer blocks may have the same composition as or different blocks from that of VdF polymer blocks, when the VdF polymer blocks comprise elastomers.

It is preferable for elastomer blocks to have a higher fluorine content than the VdF polymer blocks, so that a refractive index is decreased to improve the antiglare properties, water- and oil-repellency on the surface is improved, or a surface is less fingerprinted. Examples of the compositions of elastomer blocks are as follows:

Copolymer of 60–90 mole % of VdF and 10–40 mole % of HFP, copolymer of 60–70 mole % of VdF, 10–25 mole % of TFE and 5–30 mole % of HFP, copolymer of 40–60 mole % of VdF, 10–40 mole % of TFE and 15–45 mole % of HFP, copolymer of 30–95 mole % of VdF and 5–70 mole % of HFA, copolymer of 50–70 mole % of TFE and 30–50 mole of PMVE, copolymer of 60–80 mole % of TFE and 20–40 mole % of PPVE, copolymer of 30–70 mole % of TFE and 30–70 mole % of ropylene, polymer comprising repeating units of the formula: $(OCF_2CF_2CF_2)_a(OCF2)_b$, polymer comprising repeating units of the formula: $(OCF_2CF(CF_3))_a(OCF_2)_b$.

Among them, the following blocks are particularly preferable since they have low refractive indexes and high water- and oil-repelling effects:

copolymer of 50–70 mole % of TFE and 30–50 mole of PMVE, copolymer of 60–80 mole % of TFE and 20–40 mole of PPVE, polymer comprising repeating units of the formula: $(OCF_2CF_2CF_2)_a(OCF2)_b$, polymer comprising repeating units of the formula: $(OCF_2CF(CF_3))_a(OCF_2)_b$.

In general, the effects of the present invention are not impaired, when 5 mole % or less of known monomers are copolymerized with the above copolymers.

The refractive indexes of fluorine-containing polymers decrease, water- and oil-repellency increases, and the surfaces are less fingerprinted, as a fluorine content in the polymers increases. However, the compatibility of VdF units with acrylic resins deteriorates, and the adhesion properties worsen. Therefore, the refractive index can be decreased and the antiglare properties can be improved while maintaing the adhesion properties, when blocks for the adhesion purpose and blocks having a high fluorine content are clearly distinguished.

The molecular weight of each block is preferably 5000 or larger, and the weight average molecular weight of a whole polymer is preferably 30,000 or larger.

The polymerization method of fluorine-containing block copolymers is known as an iodine-transfer polymerization method from JP-B-58–4728 (=U.S. Pat. No. 4,158,678). Alternatively, blocks can be introduced by copolymerizing a monomer having a radical-generating source, thermally decomposing the radical-generating source to generate a radical and growing a side chain from such a radical or by reacting fragments of a chain-transfer agent at molecular terminals, or by a macromonomer method.

In the block polymerization, firstly one block is formed, and then other block or blocks are added. The kind of a block which is firstly formed is selected in accordance with the easiness of block polymerization, the easiness of post-treatment, solubility in solvents, etc. The types of block sequences may be AB blocks, ABA blocks, branched blocks, ABAB blocks, ABABA blocks, and the like.

When two kinds of polymers are simply blended instead of the use of a block polymer, the blend may have a solubility problem. When a perfluororubber and a vinylidene fluoride rubber are used, they have no common solvent and thus no homogeneous solution can be obtained. Therefore, it is impossible to form a thin film from a solution. However, blends of two or more fluorine-containing polymers having similar solubilities may be used, if they can form a homogeneous solution.

Fluorine-containing polymers may comprise blocks having resinous compositions to decrease refractive indexes. Examples of such blocks include TFE copolymers such as TFE-HFP resins, TFE-PPVE (tetrafluoroethylene-perfluoropropyl vinyl ether copolymer) resins, TFE-PMVE (tetrafluoroethylene-perfluoromethyl vinyl ether copolymer) resins, TFE-3FC1 resins, etc.; fluororine-containing alicyclic polymers; copolymers of perfluoro-4-dimethyloxol, and the like. However, the amount of blocks having resin compositions should be such that the elasticity is not lost. When the coating of fluorine-containing polymers is used on a part which is not often in contact with other articles, it may not be necessary for a polymer to include fluorine-containing elastomer blocks, and a fluorine-containing polymer may consist of resinous blocks, but the effects of the present invention are not satisfactorily achieved.

In the case of CRT or plasma displays, static electricity is easily charged on their surfaces because of their characteristics. Thus, it is preferable to add additives which impart conductivity to acrylic resin and/or fluorine-containing polymer layers. Examples of such additives are polymers having ionic groups such as $-COO^-$, $-NH_2$, $-NH^{3-}$, $-SO^{3-}$, $-NR^{11}R^{12}R^{13}$ in which $R^{11}$, $R^{12}$ and $R^{13}$ are, for example, a methyl group, an ethyl group, a n-propyl group, an n-butyl group, etc., silicone compounds, inorganic electrolytes (e.g. NaF, $CaF_2$, etc.), and the like.

It is preferable to add antistatic agents to acrylic resin and/or fluorine-containing polymer layers to prevent the accumulation of dusts. Examples of such agents are the above additives to impart conductivity, and also fine particles of metal oxides, fluoroalkoxysilanes, surfactants (anionic, cationic, amphoteric and nonionic ones), and the like.

As antistatic agents to be added to the acrylic resin layers, fine particles of metal oxides, for example, antimony-doped tin oxide (ATO) and indiumtinoxide (ITO) are preferable, since their effects are enduring and are less affected by moisture, they have high antistatic properties, and the antiglare effects can be increased because they have good transparency and high refractive indexes so that the refractive index of a substrate can be adjusted. Among them, ATO is preferable from the viewpoint of transparency, and ITO is preferable from the viewpoint of antistatic properties or conductivity. These additives can improve the antiglare properties since the refractive index can be easily adjusted even if antistatic effects are not required. When such inorganic fillers are used, the content of fillers is several ten % in terms of solid content to realize the above functions. Thus, acrylic resin layer becomes very fragile. However, when a flexible fluorine-containing polymer coating is formed on the acrylic resin layer, they together form a film having strength. In such a state, the film is hardly flawed with nails or the like.

The thickness of an acrylic resin layer is preferably in the order of submicrons not to interfere the light transmission, since ATO or ITO easily scatters or absorbs light. The thickness of the acrylic resin layer is preferably in the range between 0.05 and 0.3 $\mu$m depending on the refractive indexes of fluorine-containing polymers, to diminish the dependency of antiglare effects on wavelength and to increase the antiglare effects in all the wavelength range. Also, the optimum refractive index depends on the refractive indexes of fluorine-containing polymers, and is preferably in the range between 1.55 and 1.95.

Alkoxysilane base antistatic agents are preferably used to impart the antistatic properties to fluorine-containing polymer layers, since such agents hardly increase the refractive index and have less adverse influences on the antiglare effects. Fluoroalkoxysilanes are more preferable, since they have much less effect to increase the refractive index, and furthermore they are expected to have effects to improve the surface properties of the fluorine-containing polymer layers.

Stain-proofing properties can be improved by modifying the surface of the fluorine-containing polymer layer by crosslinking. However, the crosslinking may deteriorate the adhesion properties of the layer and flaws may not be restored. Thus, the crosslinking should be limited to the very surface layer. To crosslink fluorine-containing polymers, any crosslinking methods which are usually applied to VdF rubbers can be used, and amine-crosslinking, peroxide-crosslinking and polyol-crosslinking are exemplified.

As disclosed in JP-A-8-142280, a surfactant layer having a thickness which does not adversely influence the antiglare properties can be formed. This method is totally different from the above-described partial modification of the film. When this method is applied to the present invention, stain-proofing properties such as the prevention of adherence of dusts can be improved. The same effect may be attained by the formation of a hard-coat layer.

A hard-coat layer can be formed by applying the solution of an alkoxysilane or polysilazane, and then heating and curing it. Alternatively, UV-curable acrylic paints or melamine-crosslinked hard films may be used.

It may be possible to add fluorine-containing oils so as to impart stain-proofing properties to an antiglare layer. In such a case, the amount of fluorine-containing oils should be selected by taking into account the degradation of physical properties, and white turbidity caused by the phase separation of the oils from fluorine-containing polymers.

Methods for the formation of the thin film of a fluorine-containing polymer include a method comprising applying the dispersion of the fluorine-containing polymer, drying it and the optionally baking it to form a film, and a method comprising applying the solution of the fluorine-containing polymer and drying it. The application of a solution is preferable since the formation of a thin film is easy. In such a case, any known application method can be used insofar as a film thickness can be well controlled. For example, roll coating, gravure coating, flow coating, bar coating, spray coating, and die coating which is disclosed in JP-A-7-151904 can be used. An optimum coating method is selected from these coating methods by taking into account a balance of productivity, the controllability of a film thickness, yields, etc.

When an acrylic resin layer is crosslinked, the adhesion between the acrylic resin layer and fluorine-containing polymer layer may sometimes deteriorate, but the adhesion properties can be improved by the selection of coating conditions. Examples of measures to improve the adhesion properties are as follows:

1. A substrate is beforehand swelled with solvents.
2. Ketone base solvents are mixed with the solution of fluorine-containing polymers, or only ketone base solvents are used.
3. Fluorine-containing polymers are heat-treated after the application of the fluorine-containing polymers.
4. When the solution of fluorine-containing polymers is dip-coated on a substrate, conditions are so selected that the residence time of the substrate in the solution is extended.

The adhesion between the acrylic resin layer and fluorine-containing polymer layer can be improved by employing the above measures independently or in combination.

When a low refractive index layer consists of a VdF polymer, or more than 50 mole % of molecules consists of a VdF copolymer, known solvents, which are used as solvents for VdF polymers, may be used. Examples of such solvents are ketone base solvents such as acetone, methyl ethyl ketone, methyl isobutyl ketone, cyclohexanone, etc.; ester base solvents such as ethyl acetate, butyl acetate, etc.; and nitrogen-containing solvents such as dimethylformamide, dimethylacetamide, etc.

Preferably, butyl acetate, propyl acetate, isopropyl acetate, methyl isobutyl ketone, cyclohexanone and their mixtures are used, since their boiling points are not too low, and their solutions have good film-forming properties.

When the solution of a fluorine-containing polymer is applied on an acrylic resin layer, the acrylic resin layer may be whitened depending on the compatibility with the solvents. In such a case, the kind of solvents should be changed, or the composition or crosslinking density of the acrylic resin layer should be changed. The possibility of whitening decreases as he crosslinking density increases.

Fluorine-containing solvents such as perfluoro-2-butyltetrahydrofuran (FLORINATE FC 75 (trademark)) and perfluorobenzene may be used when fluorine-containing elastomer blocks have a high fluorine content and such blocks constitute a half or more of a molecule. Such fluorine-containing solvents may be used independently or in admixture of two or more of them.

When fluorine-containing polymers are block copolymers, non-aqueous dispersions form and thus transparent liquids cannot be obtained, if solvents in which each block has different solubility are used, and the polymers are mixed in such solvents. However, the use of such solvents is not an obstacle to the formation of a uniform film, insofar as the size of the particles of fluorine-containing polymers is sufficiently smaller than the film thickness and particles are stably and uniformly dispersed in the solvent. When the particle size is substantially equal to or larger than the film thickness, film surfaces have unevenness so that non-glare effects can be imparted together with the AR effects. Thus, the antiglare properties can be improved. However, the degree of unevenness should be in a range such that optical problems such as the deterioration of resolution or the decrease of transparency do not arise.

A film thickness may be controlled by very simple coating methods such as spray coating and flow coating, when two or more solvents having different evaporation rates are used, for example, a mixed solvent of a good solvent having a boiling point of 100° C. or less and a poor solvent having a boiling point of 150° C. or higher is used as in the case where VdF rubbers are dissolved in a mixed solvent of methyl ethyl ketone and cyclohexanone. In such a case, the amount of a poor solvent having a high boiling point is preferably 10 wt. % or less of the whole solvents. However, this method is largely influenced by a solid content in the solution, and thus requires the strict control of a concentration.

The effects of the present invention are remarkable when the present invention is applied to the following articles:

optical parts such as prisms, lens sheets, polarizer plates, optical filters, lenticular lenses, flat lenses (e.g. Fresnel lenses, etc.), screens of back-lighting displays, optical fibers, optical couplers, and the like;

transparent protective plates such as glass of show windows, glass of show cases, covers of advertisements, covers of photostands, and the like;

protective plates of CRT, liquid crystal displays, plasma displays, back-lighting displays, and the like;

optical recording media such as magneto-optical discs, read-only optical discs (e.g. CD, LD, DVD, etc.), phase-transfer optical discs (e.g. PD, etc.), hologram recording media, and the like;

inner surfaces of protective covers of illuminators such as halogen lamps, fluorescent lamps, light bulbs, and the like.

When the adhesion between acrylic resins and other materials is low, it can be increased by the provision of adhesive layers between them. The number of adhesive layers is not limited, but a single adhesive layer is preferable from the viewpoint of costs. Silane-coupling agents such as phenylsilane, minosilane, epoxysilane, acrylsilane, etc. may be used as the components of the adhesive layers on materials having many hydroxyl groups on surfaces, such as glass. The same techniques as those applied to primers for general paints, or adhesives, for example, crosslinking with epoxy, urethane or acrylurethane compounds can be used in the present invention.

EXAMPLES

Synthesis Example 1

(1) In a 3000 ml autoclave, ion-exchanged water (2000 ml) and ammonium perfluorooctanoate (20 g) were charged, and the pressurizing of the autoclave with nitrogen up to 3 kgf/cm$^2$G and depressurizing to −0.8 kgf/cm$^2$G were repeated twice while stirring. After that, a monomer mixture of perfluoromethyl vinyl ether (PMVE) and tetrafluoroethylene (TFE) in a molar ratio of 70:30 was charged at 50° C. to raise the pressure to 10 kgf/cm$^2$G, and then I(CF$_2$CF$_2$)$_2$, (3.6 g) was charged under the pressure of nitrogen gas. Thereafter, the aqueous solution (5 ml) of ammonium persulfate (APS) (0.74 g) was charged under pressure of nitrogen gas. The polymerization reaction was continued until the total amount of the consumed monomers reached 400 g, while maintaining the pressure at 10 kgf/cm$^2$G by supplementing the monomer mixture of PMVE and TFE in a molar ratio of 40:60 whenever the internal pressure decreased by 1 kgf/cm$^2$G due to the consumption of the monomers with the progress of polymerization. After that, the monomers were discharged and removed from the autoclave to stop the reaction.

The obtained reaction mixture was a milky-white dispersion, and the polymer content was 16.4 wt. %. The monomeric composition was measured by melt NMR. The molar ratio of PMVE to TFE was 40:60.

According to JP-B-58-4728 (=U.S. Pat. No. 4,158,678), both terminals of polymer chains, which are prepared by such a reaction (iodine-transfer polymerization), have iodine atoms transferred from an iodide which is added at the start of the polymerization. Thus, the number of polymer molecules is the same as the number of iodide molecules. Accordingly, the weight average molecular weight of the obtained polymer was about 50,000 when it was calculated from the weight of consumed monomers and the number of polymer molecules.

(2) In a 500 ml autoclave, the dispersion (80 g), which was obtained in the above step (1), was charged, and ion-exchanged water (126 g) was supplemented. After replacing the interior atmosphere of the autoclave with a monomer mixture of HFP and VdF in a molar ratio of 55:45 at 80C while stirring, the autoclave was pressurized with the same monomer mixture up to 12 kgf/ m$^2$G. After that, the aqueous solution (2g) of APS (3 mg) was charged under the pressure of nitrogen gas. The polymerization reaction was continued while maintaining the pressure at 12 kgf/cm$^2$G by supplementing the monomer mixture of HFP and VdF in a molar ratio of 20:80 whenever the pressure decreased by 1 kgf/cm$^2$G due to the consumption of the monomers with the progress of polymerization. After 4 hours from the initial charge of APS, APS (3 mg) was supplemented, and the polymerization reaction was continued until the total amount of the consumed monomers reached 26.4 g. Thereafter, the monomers were discharged and removed from the autoclave to stop the reaction. The content of the polymer in the obtained reaction mixture was 17.1 wt. %.

Since the additionally polymerized monomers were grown by the iodine-transfer polymerization, the average molecular weight of the added blocks was calculated at 100,000 in total, according to the same assumption as in the above step (1).

The amount of the PMVE/TFE copolymer block contained in the synthesized polymer was about one third of the polymer by weight. The PMVE/TFE copolymer is insoluble in methyl ethyl ketone or butyl acetate, and thus cannot be homogeneously dispersed in such a solvent. However, the obtained polymer as a whole could be dispersed in methyl ethyl ketone or butyl acetate and formed a slightly white homogeneous liquid, which seemed to be in the form of a non-aqueous dispersion.

In the light of the above polymerization method and this dispersibility, the obtained polymer might be a block polymer consisting of the blocks A of HFP/VdF (molar ratio of 20:80) having a molecular weight of 100,000 in total at both terminals, and the center block B of PMVE/TFE (molar ratio of 40:60) having a molecular weight of 50,000. This block polymer should have been a ABA type since the initially used iodide compound was a diiodide.

Polymer 2

A VdF base fluororubber (G501 available from Daikin Industries, Ltd.) was used as a green rubber.

Comparative Synthesis Example 1

2,2,3,3,3-Pentafluoropropyl-2 fluoroacrylate (100 g), AIBN (azoisobutyronitrile) (0.015 g) and isooctyl mercaptoate (chain transfer agent) (2.0 g) were mixed, and degassed in vacuo. Then, the reaction mixture was maintained at 50° C. for 24 hours.

The obtained polymer was purified by dissolving it in acetone and pouring the solution into methanol to reprecipitate it.

Example 1

The polymer 2 was dissolved in butyl acetate to obtain a 5 wt. % solution. A PMMA (polymethyl methacrylate) plate was dip-coated with the solution by dipping the plate in the solution and pulling up the plate at a rate of 20 mm/min.

Example 2

The polymer obtained in the step (2) of Synthesis Example 1 was dissolved in butyl acetate to obtain a 3 wt. % solution. This solution was slightly white, and in the form of a non-aqueous dispersion. A PMMA plate was dip-coated with the solution at a pulling-up rate of 2 00 mm/m in.

Example 3

HITALOID 3004 (available from Hitachi Chemical Co., Ltd.) and COLONATE HX (available from NIPPON POLYURETHANE INDUSTRY CO., LTD.) were mixed in a weight ratio of 100:11, and the mixture was diluted with butyl acetate to a concentration of one third to obtain an acrylic paint.

This paint was dip-coated on a polyethylene terephthalate (PET) plate at a pulling-up rate of 500 mm/min. After air-drying, the coated PET plate was placed on an aluminum plate to prevent the heat deformation of the PET plate and heat-treated at 80° C. for 2 hours. After cooling, the PET plate was further coated with the polymer 2 in the same manner as in Example 1.

Example 4

The main component (190 wt. parts) of the antistatic paint P-3574 consisting of a thermosetting acrylic resin as a binder and fine particles of antimony-doped tin oxide dispersed in the binder (available from CATALYSTS & CHEMICALS INDUSTRIES CO., LTD), the curing agent of P-3574 (19 wt. parts), the acrylic lacquer paint DIANAL LR 630 (available from Mitsubishi Rayon Co., Ltd.) (10 wt. parts) and butyl acetate (800 wt. parts) were mixed and used as an undercoating paint. The weight ratio of the solid components in these ingredients (antistatic agent in the main component of P-3574: resin in the main component of P-3574: curing agent:solid component in LR630) was about 40:10:5:2.

This mixture was dip-coated on an acrylic casting plate at a pulling-up rate of 100 mm/min., and heat treated at 80° C. for 90 minutes. The thickness of the formed undercoat was 0.20 μm when measured with an ellipsometer (Auto EL sold by TOKYO ELECTRON LIMITED).

Then, the undercoated plate was dip-coated with the 3 wt. % solution of the polymer 2 in methyl isobutyl ketone (MIBK) at a pulling-up rate of 200 mm/min. In this case, the plate was maintained in the solution (for about 60 seconds) prior to the dip-coating process. Thus, the matching of the undercoat with the topcoat was made uniform, so that an even film could be easily formed.

After that, the coated plate was heat treated at 80° C. for 90 minutes. When the heat-treatment is not started within 30 minutes after the finish of the dip-coating, adhesion failure may occur between the undercoat and topcoat.

Example 5

An antiglare-treated article was produced in the same manner as in Example 4 except that COLONATE HX (2 wt. parts) was used in place of the curing agent of P-3574 (19 wt. parts).

The weight ratio of the solid components in the ingredients (antistatic agent in the main component of P-3574: resin in the main component of P-3574:COLONATE HX (curing agent):solid component in LR630) was about 40:10:2:2. The thickness of the undercoat was 0.21 μm.

Comparative Example 1

The polymer 2 was dissolved in butyl acetate to obtain a 5 wt. % solution. This solution was dip-coated on a PET plate at a pulling-up rate of 10 mm/min. The parts of the substrate plate which were whitened with the solvent were excluded from the evaluation and testing.

Comparative Example 2

The polymer obtained in Comparative Synthesis Example 1 was coated on a PMMA plate in the same manner as in Comparative Example 1 except that the polymer concentration was 3 wt. %, and the pulling-up rate was 100 mm/min.

Comparative Example 3

HITALOID 3004 and CLOLONATE HX were mixed in a weight ratio of 100:11, and the mixture was diluted with butyl acetate to a concentration of one third to obtain an acrylic paint.

This paint was dip-coated on a polyethylene terephthalate (PET) plate at a pulling-up rate of 500 mm/min. After air-drying, the coated PET plate was placed on an aluminum plate to prevent the heat deformation of the PET plate and heat-treated at 80° C. for 2 hours.

With the antiglare-treated plates produced in the above Examples and Comparative Examples, a reflectance, resistance to wiping-abrasion, abrasion resistance, adhesion strength, a light transmittance, a film thickness, a reflectance after a wiping test, the refractive index of a fluorine-containing polymer and dust-adsorption properties were measured by the following methods:

1. Reflectance A five-degree regular reflection unit was mounted on a visible light-UV ray spectroscope U-3410 (manufactured by HITACHI LIMITED), and a single-side reflectance was measured at 550 nm.

2. Resistance to wiping-abrasion

Ten pieces of a standard cotton cloth (white broadcloth) were laminated and attached to a rubbing tester (manufactured by TAIHEI RIKA KOGYO Co., Ltd.). Then, the antiglare film was rubbed by reciprocating the cotton cloth over the film 100 times while applying a load of 900 g per 6.2 cm$^2$ (a pressure of about 150 gf/cm$^2$). After that, the condition of the film was observed and evaluated according to the following three ranks:

O: No change of appearance was observed.

Δ: The film thickness changed, and the increase of the reflectance could be confirmed with an eye.

X: The substrate surface appeared in some parts.

3. Abrasion resistance

A film surface was abraded with a nail by reciprocating the nail over the film surface 10 times while applying a load of 500 gf.

After the surface was cleanly wiped, the degree of abrasion was checked and evaluated according to the following three ranks:

O: No change of appearance was observed.

Δ: A few small marks were observed.

X: Large marks or many marks were observed.

4. Adhesion strength

A cross hatch peeling test with an adhesive tape was carried out according to JIS K 5400.

5. Light transmittance

A light transmittance at 550 nm was measured with a visible light-UV ray spectroscope U-3410 (manufactured by HITACHI LIMITED) using an air as a reference.

6. Film thickness

A substrate plate coated with an antiglare-film was frozen and fractured, and the fractured surface was observed with a scanning electron microscope.

7. Reflectance After a Wiping Test

After the test of resistance to wiping-abrasion, a single-side reflectance was measured in the same manner as above.

8. Refractive Index of a Fluorine-containing Polymer

A refractive index was measured with an Abbe refractometer (manufactured by KABUSHIKIKAISHA ATAGO) at 25° C. with light having a wavelength of 550 nm.

9. Dust-adsorption Properties

In an atmosphere of 50%RH or less, 10 pieces of KIM-WIPE (a trademark) (available from KABUSHIKIKAISHA CRESIA) each having a size of 5 mm×5 mm were collocated, and the test specimen of the antiglare-treated plate, which had been abraded by the same method as in the test of resistance to wiping-abrasion, was approached downwardly towards the pieces of KIM-WIPE to a distance of 3mm, and stopped at that distance for 5 seconds. Then, the test specimen was slowly lifted up.

When two or more pieces of KIM-WIPE electrostatically adhered to the test specimen, the test specimen was evaluated as "ADSORPTIVE", while no pieces of KIM-WIPE electrostatically adhered to the test specimen was evaluated as "NON-ADSORPTIVE". When one piece of KIM-WIPE adhered to the test specimen, the test was repeated from the step of rubbing, and the test specimen was reevaluated.

The results of the above evaluations and measurements are listed in Table 1.

TABLE 1

| | | | TESTS | | | | | | | |
|---|---|---|---|---|---|---|---|---|---|---|
| | F-cont. polymer | Plate material | Reflectance (%) | Resistance to wiping-abrasion | Abrasion resistance | Adhesion | Light transmittance | Film thickness (μm) | Reflectance aft. wiping test | Refractive index | Dust adsorption |
| Ex. 1 | Polymer 2 | Acrylic plate | 1.2 | ○ | ○ | 100/100 | 96.9 | 0.12 | 1.5 | 1.357 | ADSORPTIVE |
| Ex. 2 | Synth. Exam. 1 (2) | ↑ | 1.1 | ○ | ○ | 100/100 | 97.2 | 0.13 | 1.5 | 1.337 | ADSORPTIVE |
| Ex. 3 | Polymer 2 | ↑ | 1.3 | Δ | ○ | 100/100 | 93.9 | 0.10 | 1.9 | 1.357 | ADSORPTIVE |
| Ex. 4 | Polymer 2 | Anti-static acrylic paint | 0.5 | Δ | ○ | 100/100 | 96.8 | 0.09 | 0.7 | 1.357 | NON-ADSORPTIVE |
| Ex. 5 | Polymer 2 | ↑ | 0.5 | ○ | ○ | 100/100 | 97.0 | 0.10 | 0.5 | 1.357 | NON-ADSORPTIVE |
| C. Ex. 1 | Polymer 2 | PET | 1.1 | X | X | 100/100 | 95.4 | 0.10 | 3.6 | 1.357 | ADSORPTIVE |
| C. Ex. 2 | Comp. Synth. Exam. 1 | acrylic plate | 1.6 | X | X | 92/100 | 96.0 | 0.12 | 4.3 | 1.357 | ADSORPTIVE |
| C. Ex. 3 | None | ↑ | 4.3 | ○ | ○ | 100/100 | 88.3 | — | 4.3 | — | ADSORPTIVE |

What is claimed is:

1. An antiglare-treated article comprising an acrylic resin substrate and a fluorine-containing polymer coating formed on the surface of the substrate, wherein the thickness of the coating is in the range between 0.03 and 0.5 μm, and the fluorine-containing polymer has a refractive index in the range between 1.30 and 1.40 and comprises a block which is compatible with the acrylic resin and a block comprising a fluorine-containing elastomer.

2. An antiglare-treated article according to claim 1, wherein said block which is compatible with the acrylic resin comprises 50 to 100 mole % of vinylidene fluoride.

3. An antiglare-treated article according to claim 1, wherein said acrylic resin substrate comprises a body of a material and an acrylic resin layer which is formed by applying an acrylic resin coating on the surface of said body, and the acrylic resin layer has a refractive index in the range between 1.55 and 1.95.

4. An antiglare-treated article according to claim 3, wherein the resin component of said acrylic resin coating contains an acrylic resin having a resin comprised of monomers wherein each of said monomers have a single crosslinking site wherein said monomers are comprised of a carbonyl group and a crosslinkable polymer.

5. An antiglare-treated article according to claim 3, wherein said acrylic resin coating contains a tin oxide antistatic agent, and the resin layer formed from said acrylic resin coating has a refractive index in the range between 1.55 and 1.95.

6. An anitglare-treated article according to claim 1, wherein the block which is compatible with the acrylic resin of the fluorine-containing polymer is a copolymer of vinylidene fluoride and a member selected from the group consisting of tetrafluoroethylene, hexafluoropropylene, trifluorochloroethylene and hexafluoroacetone.

7. An anitglare-treated article according to claim 1, wherein the block comprising a fluorine-containing elastomer of the fluorine-containing polymer as a copolymer of vinylidene fluoride and a member selected from the group consisting of tetrafluoroethylene, hexafluoropropylene, hexafluoroacetone, perfluoromethyl vinyl ether, and perfluoropropyl vinyl ether.

8. An anitglare-treated article according to claim 7, wherein the block which is compatible with the acrylic resin of the fluorine-containing polymer is a copolymer of vinylidene fluoride and a member selected from the group consisting of tetrafluoroethylene, hexafluoropropylene, trifluorochloroethylene and hexafluoroacetone.

9. An antiglare-treated article according to claim 7, wherein the block which is compatible with the acrylic resin of the fluorine-containing polymer is selected from the group of:

copolymer of 70–90 mole percent vinylidene fluoride and 10–30 mole percent of the tetrafluoroethylene;

copolymer of 60–90 mole percent of vinylidene fluoride and 1–40 mole percent of hexafluoropropylene;

copolymer of 60–70 mole percent of vinylidene fluoride, 10–25 mole percent of tetrafluoroethylene and 5–30 mole percent of hexafluoropropylene; copolymer of 40–60 mole percent of vinylidene fluoride, 10–40 mole percent of tetrafluoroethylene and 15–45 mole percent of hexafluoropropylene;

copolymer of 35–55 mole percent of vinylidene fluoride, 35–55 mole percent of tetrafluoroethylene and 5–15 mole percent of hexafluoroethylene;

copolymer of 60–90 mole percent of vinylidene fluoride, 5–20 mole percent of tetrafluorethylene and 13–30 mole percent of trifluorochloroethylene; and copolymer of 30–95 mole percent of vinylidene fluoride, 1–30 mole percent of tetrafluorethylene and 5–70 mole percent of hexafluoroacetone.

10. An antiglare-treated article according to claim 7, wherein the fluorine-containing elastomer of the fluorine-containing polymer is selected from the group consisting of:

copolymer of 60–90 mole percent of vinylidene fluoride and 10–40 mole percent of hexafluoropropylene;

copolymer of 60–70 mole percent of vinylidene fluoride, 10–25 mole percent of tetrafluoroethylene and 5–30 mole percent of hexafluoropropylene;

copolymer of 40–60 mole percent of vinylidene fluoride, 10–40 mole percent of tetrafluoroethylene and 15–45 mole percent of a fluoropropylene;

copolymer of 30–95 mole percent of vinylidene fluoride and 50–70 mole percent of hexafluoroacetone;

copolymer of 50–70 mole percent of tetrafluoroethylene and 30–50 mole percent of perfluoromethyl vinyl ether;

copolymer of 60–80 mole percent of tetrafluoroethylene and 20–40 mole percent of perfluoropropyl vinyl ether; and copolymer of 30–70 mole percent of tetrafluoroethylene and 30–70 mole percent of propylene.

11. An antiglare-treated article according to claim 7, wherein the fluorine-containing elastomer of the fluorine-containing polymer comprises repeating units of the formula $(OCF_2CF_2CF_2)_a(OCF_2)_b$ and $(OCF_2CF(CF_3))_a(OCF_2)_b$.

* * * * *